United States Patent [19]
Humblet

[11] Patent Number: 5,812,602
[45] Date of Patent: Sep. 22, 1998

[54] SYSTEM AND DEVICE FOR, AND METHOD OF, COMMUNICATING ACCORDING TO A TRELLIS CODE OF BASEBAND SIGNALS CHOSEN FROM A FIXED SET OF BASEBAND SIGNAL POINTS

[75] Inventor: Pierre A. Humblet, Cannes, France

[73] Assignee: Motorola Inc., Schaumburg, Ill.

[21] Appl. No.: 749,040

[22] Filed: Nov. 14, 1996

[51] Int. Cl.$^6$ ............................. H04L 5/12; H04L 27/34
[52] U.S. Cl. ........................................ 375/265; 371/43.4
[58] Field of Search ............................ 375/260, 265, 375/261, 295; 371/43.4

[56] References Cited

U.S. PATENT DOCUMENTS

| | | | |
|---|---|---|---|
| 5,040,191 | 8/1991 | Forney, Jr. et al. | 375/261 |
| 5,394,437 | 2/1995 | Ayanoglu et al. | 375/222 |
| 5,528,625 | 6/1996 | Ayanoglu et al. | 375/222 |

FOREIGN PATENT DOCUMENTS

PCT/US95/15924  6/1996  WIPO.

OTHER PUBLICATIONS

Rockwell International, 56 Kbps Communications Across the PSTN, 1996, Internet URL, http://www.nb.rockwell.com/nr/modemsys/.

Kalet, I.; Mazo, J.E.; Saltzberg, B.R.; The Capacity of PCM Voiceband Channels, 1993, IEEE 0–7803–0950–2/93, pp. 507–511.

Forney, G.D. Jr.; Calderbank, A.R.; Coset Codes for Partial Response Channels; or, Coset Codes with Spectral Nulls, Sep. 1989, IEEE Trans. Information Theory, vol. IT–35, pp. 925–943.

Calderbank, A.R.; Lee, T.A.; Mazo, J.E.; Baseband Trellis Codes with a Spectral Null at Zero, IEEE Trans. Information Theory, vol. IT–34, pp. 425–434, 1988.

Calderbank, A.R.; Mazo, J.E.; Baseband line codes via spectral factorization, IEEE J. Select. Areas Commun., vol. SAC–7, pp. 914–928, 1989.

Forney, C.D. Jr.; Eyuboglu, M.V.; Combined Eqalization and Coding Using Precoding, IEEE Communications Magazine, vol. 29, No. 12, pp. 25–34, Dec. 1991.

Eyuboglu, M.V.; Forney, G.D. Jr.; Trellis Precoding: Combined Coding, Precoding and Shaping for Intersymbol Interference Channels, IEEE Trans. Information Theory, vol. 38, pp. 301–314, Mar. 1992.

Humblet, Pierre A.; The Information Driveway, IEEE Communications Magazine, pp. 64–68, Dec. 1996.

Primary Examiner—Temesghen Ghebretinsae
Attorney, Agent, or Firm—Peter M. Dichiara; John W. Powell

[57] ABSTRACT

System and Device for, and Method of, Communicating According to a Trellis Code of Baseband Signals Chosen from a Fixed Set of Baseband Signal Points. Signal points are chosen from a fixed set of signal points, such as exists in the baseband signal points found in PSTN companding algorithms. These signal points are assingned to subsets and transmitted according to a predefined transmitter state sequence, representable as a trellis diagram. The subsets may overlap by sharing signal points. The sharing of signal points improves the transmission performance of the arrangement in comparison to conventional disjoint sets. The signal points are selected and associated with subsets, such that the signal points transmittable from a given transmitter states maintain a minimum distance of d, even though the full combination of signal points of all subsets need not satisfy a minimum distance of d/2. From time-to-time, disjoint subsets may be used to preclude decoding problems resulting from the quasi catastrophic aspects of the resulting code.

4 Claims, 10 Drawing Sheets

SYSTEM AND DEVICE FOR, AND METHOD OF, COMMUNICATING ACCORDING TO A TRELLIS CODE OF BASEBAND SIGNALS CHOSEN FROM A FIXED SET OF BASEBAND SIGNAL POINTS

CROSS-REFERENCE TO RELATED APPLICATIONS

This application is related to the following U.S. applications, all of which are owned by the same assignee and all of which are incorporated by reference in their entirety:

Device, System and Method for Spectrally Shaping Transmitted Data Signals, to Vedat Eyuboglu and Pierre Humblet, filed on Oct. 15, 1996, Ser. No. 08/730,434;

Device, System and Method for Adaptive Self-Noise Cancellation for Decision-Directed Timing Recovery to Jian Yang, filed on Oct. 15, 1996, Ser. No. pending;

System and Device for, and Method of, Detecting, Characterizing, and Mitigating Deterministic Distortion in a Communication System, to Vedat Eyuboglu, Arthur Barabell, and Pierre Humblet, filed on Oct. 15, 1996, Ser. No. 08/730,433; and System and Device for, and Method of, Processing Baseband Signals to Combat ISI and Nonlinearities in a Communication System, to Pierre Humblet and Vedat Eyuboglu, filed on Oct. 15, 1996, Ser. No. pending.

BACKGROUND

1. Field of the Invention

The invention relates generally to communication systems and, more particularly, to high-speed end-to-end modem communications over the public switched telephone network (PSTN).

2. Discussion of Related Art

There is an increasing demand for data communications and, in particular, for communication systems with increasingly higher transmission rates. With the advent of the Internet and multimedia, this demand is not expected to wane any time soon.

To date, the most popular form of data communications is accomplished using voiceband modems connected to local loops of a conventional PSTN. Voiceband modems are very popular largely because of their leverage of existing telephone network infrastructure. In short, a user needs to make only a relatively small investment for a modem and has to pay relatively modest line charges. To meet user demand for higher transmission rates, communication standards for voiceband modems have evolved with each generation including capabilities to support increasingly higher transmission rates.

Unfortunately, the rate of growth of the transmission rates of modems has slowed as transmission rates approach the information theoretic limits of the telephone channel. Consequently, users who want higher transmission rates are forced to use in their homes or offices alternative communication networks, such as ISDN, rather than the conventional PSTN. Though these alternative arrangements provide higher transmission rates, the equipment and line charges are high.

The backbone of the modern telephone network is a circuit-switched digital network ("backbone"). In the case of ISDN, an ISDN terminal adaptor connects the home or office to a central office via an ISDN link. The data carried over the link is transmitted at 64 kb/s and may be thought of as a stream. The central office can arrange several streams to be carried over the digital backbone. In the case of PSTN, a modem sends analog signals to a local switch, or line interface, which converts the signals into a 64 kb/s bitstream using Pulse Code Modulation (PCM) and the resulting digital information is then carried across the digital backbone. The backbone is typically arranged as a "T-carrier system," which among other things specifies how various streams are arranged with other streams, routed, and controlled when carried over the backbone.

There is a need in the art for a device and system for, and method of, communicating at higher information rates over the PSTN by avoiding or reducing the effects of quantization noise and robbed bit signaling.

SUMMARY

This invention allows binary information to be transmitted over conventional telephone networks that include conventional digital backbones, line interfaces, and analog local loops at transmission rates higher than presently achievable with existing modem standards such as V.34. This is achieved by viewing the conventional network from a new perspective, in which certain sources of "noise" that limit the achievable bit rate are avoided with new processing techniques. The invention improves the system's information capacity and concomitantly achieves higher transmission rates without requiring costly infrastructure, such as ISDN lines or the like, at the user site.

According to one aspect of the invention, a method, device, and system are provided for communicating according to a new trellis code, in which the system is inherently limited to having a fix set of potential signal points that the system may use to communicate. From this fixed set, signal points are selected to form subsets of signal points. There is no prohibition of one subset overlapping with another by sharing subsets, and exemplary embodiments are expected to exploit this flexibility to improve transmission performance. The subsets are associated with transmitter states, such that a given transmitter state is associated with some of the subsets. Information may then be transmitted according to the transmitter states, so that when in a given transmitter state information is mapped to one of the subsets associated with that state and to a signal point in the mapped subset. The signal points are received and define a received sequence of signal points. The sequence is decoded to predict the information that caused the transmitted signal point.

Another aspect of the invention involves the fixed set of signal points being unevenly spaced according to a logarthmic scale. This arrangement, for example, is found in known companding algorithms such as A-law and $\mu$-law. Under this aspect, the signal points having the larger spacings to adjacent signal points are shared, but the signal points with smaller spacings may not be. This aspect provides better noise resistance.

Another aspect of the invention involves organizing the subsets and selecting the points such that in a given transmitter state the transmittable points are spaced at least d apart, even though the combination of all selecting signal points constituting all of the subsets may not satisfy a minimum distance of d/2. This allows more signal points to be chosen from the fixed set, improving transmission performance.

Another aspect of the invention uses time-varying subsets so that from time-to-time, i.e., a portion of the transmittable cycles, the signals are mapped into subsets that do not overlap. This address quasi-catastrophic aspects of the system that may otherwise possibly, but not necessarily, occur.

DETAILED DESCRIPTION

This invention allows binary information to be transmitted over conventional telephone networks that include conventional digital backbones, line interfaces, and analog local loops at transmission rates higher than presently achievable with existing modem standards such as V.34. This is achieved by viewing the conventional network from a new perspective, in which certain sources of "noise" that limit the achievable bit rate are avoided with new processing techniques. The invention improves the system's information capacity and concomitantly achieves higher transmission rates without requiring costly infrastructure, such as ISDN lines or the like, at the user site.

To better understand the invention, certain aspects of a conventional telephone network are described. This is done to explain the various sources and forms of "noise" that limit the information capacity of a conventional arrangement and that are addressed with the invention. Afterwards, the architecture and operation of the invention are described, followed by a description of the invention's mechanisms for improving transmission efficiency with a new trellis coding technique.

Figure 1:
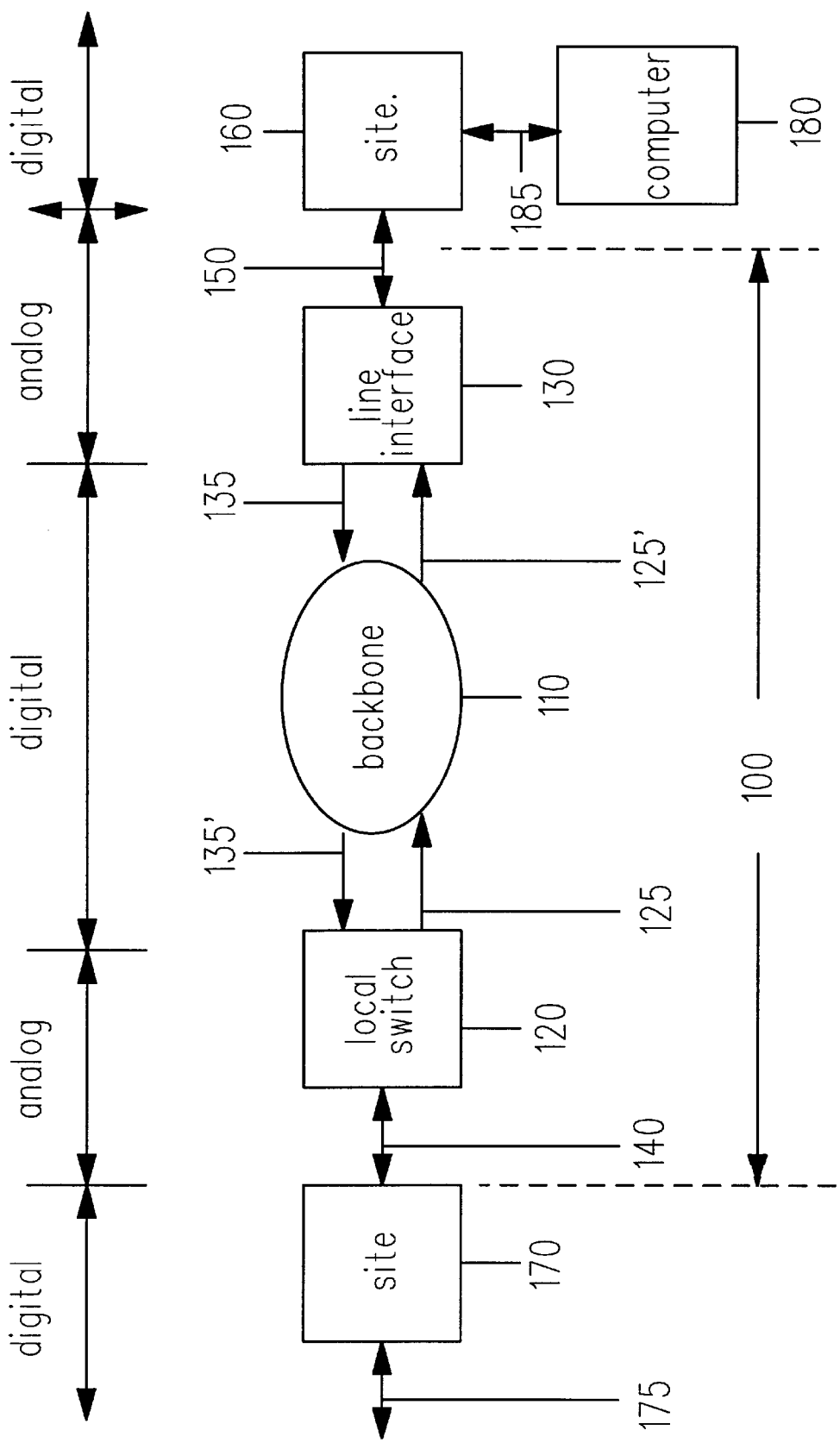
FIG. 1 shows a conventional telephone system having local loops.

A conventional telephone network 100 is shown in FIG. 1. What are typically interpreted as analog signals enter and exit the network 100 at "local loops" 140 and 150. Each signal on loop 140 and 150 is received by a corresponding line interface 120 and 130, or local switch, and each line interface communicates with another via a backbone digital network 110.

Under conventional operation, an information signal 175 is sent to a first site 170, which emits an analog signal, for example, representative of a voice signal or a binary information, on the local loop 140. The line interface 120 filters, samples, and quantizes the analog signal and outputs a sequence of octets 125, representative of the analog signal 140.

More specifically, the analog signal 140 is quantized according to a known set of rules, or a companding algorithm, such as μ-law or A-law, which specifies the quantization's amplitude levels among other things. The μ-law and A-law quantization rules involve unevenly-spaced quantization steps, i.e., non-uniform quantization, that were chosen to map to the inherent characteristics of speech.

The backbone 110 receives the octet sequence 125 and, though not shown, also receives octet sequences from other sources, such as other line interfaces. Using known multiplexing techniques, the backbone 110 combines octet sequences from the various sources and transmits and routes the data to various line interfaces, e.g., 130. Modern backbones transmit the individual octet sequences at a rate of 64,000 bits per second (8,000 octets per second). Eventually an octet sequence 125', which is similar but not necessarily identical to the original octet sequence 125, is transmitted to the line interface 130 corresponding to the destination site 160.

The line interface 130 essentially inverse quantizes and further processes the received octet sequence 125' to create on loop 150 an analog signal, which is an "approximate representation" of the originally-transmitted signal 140. Loop signal 150 is called an "approximate representation" because information may have been lost in the quantization and inverse quantization processes of the line interfaces. Signal 150 is then transmitted to the site 160, where it may be used to recreate a voice signal or a binary sequence.

Information may analogously flow in the opposite direction. Destination 160 provides analog signal on loop 150 to line interface 130. Line interface 130 samples and quantizes the signal on loop 150 to provide a sequence of octets 135 to backbone 110. Backbone 110 routes these octets and provides a similar sequence of octets 135' to line interface 120. Line interface 120 provides analog signal on loop 140 to be received by the site 170.

When used for conventional data communications, as opposed to voice communications, the sites 160 and 170 may each include a modem for modulation and demodulation. A conventional modem at the site 170, for example, will receive a sequence of bits 175 from some form of an information source (e.g., a server) and modulate the bits and transmit the modulated signal, according to a communication standard, such as V.34. The modulated signal is routed to the line interface 120 where it is filtered, sampled, and quantized, as outlined above. Eventually a representative signal is received by the other modem at site 160, where it may be demodulated, and the decoded binary information is transmitted to computer 180.

Systems following the above conventional arrangement have achieved transmission rates of approximately 30 Kb/s, the conventionally-accepted view of the telephone channel's capacity. This accepted limit of capacity is dependent on the "noise" in the system, and in particular, the quantization noise of the line interfaces and other distortion inherent in the system, such as robbed bit signaling.

The invention attains higher transmission rates yet operates in arrangements having conventional analog local loops, unlike the ISDN and similar approaches, outlined above. In short, the invention is able to attain these advantages by considering the conventional network from a new perspective. Under this new paradigm, the invention reconsiders, and where appropriate combats with new processing techniques, the various forms of "noise" that limit the information capacity.

More specifically, the invention treats a signal s (t) on the local loop 150 as a discrete baseband signal and the inverse quantization process in line interface 130 as a baseband modulation that yields the baseband line interface signal s (t). The modulation technique is akin to PAM in that a signal's amplitude is used to modulate a waveform, but different from conventional PAM in that the amplitudes of the signal points are non-uniformly-spaced. The signal s (t) is in the form $$s(t)=\Sigma_n a(\upsilon_n)g(t-nT) \qquad (1)$$

In equation (1), the sequence $\upsilon_n$ represents the octets 125' received from the digital backbone 110; a $(\upsilon_n)$ represents the amplitude of the quantization level corresponding to octet $\upsilon_n$ 125' according to the relevant quantization rules, e.g.,μ-law; T equals the sampling interval of the system, e.g., 125 μs; and g (t) is an interpolation function (or the modulation waveform) which is band-limited to approximately 4000 Hz.

The new perspective yields powerful results, the most important of which is that, unlike conventional systems, embodiments of the invention are not limited in their capacity to carry information by the quantization noise inherent in the line interfaces.

Figure 2:
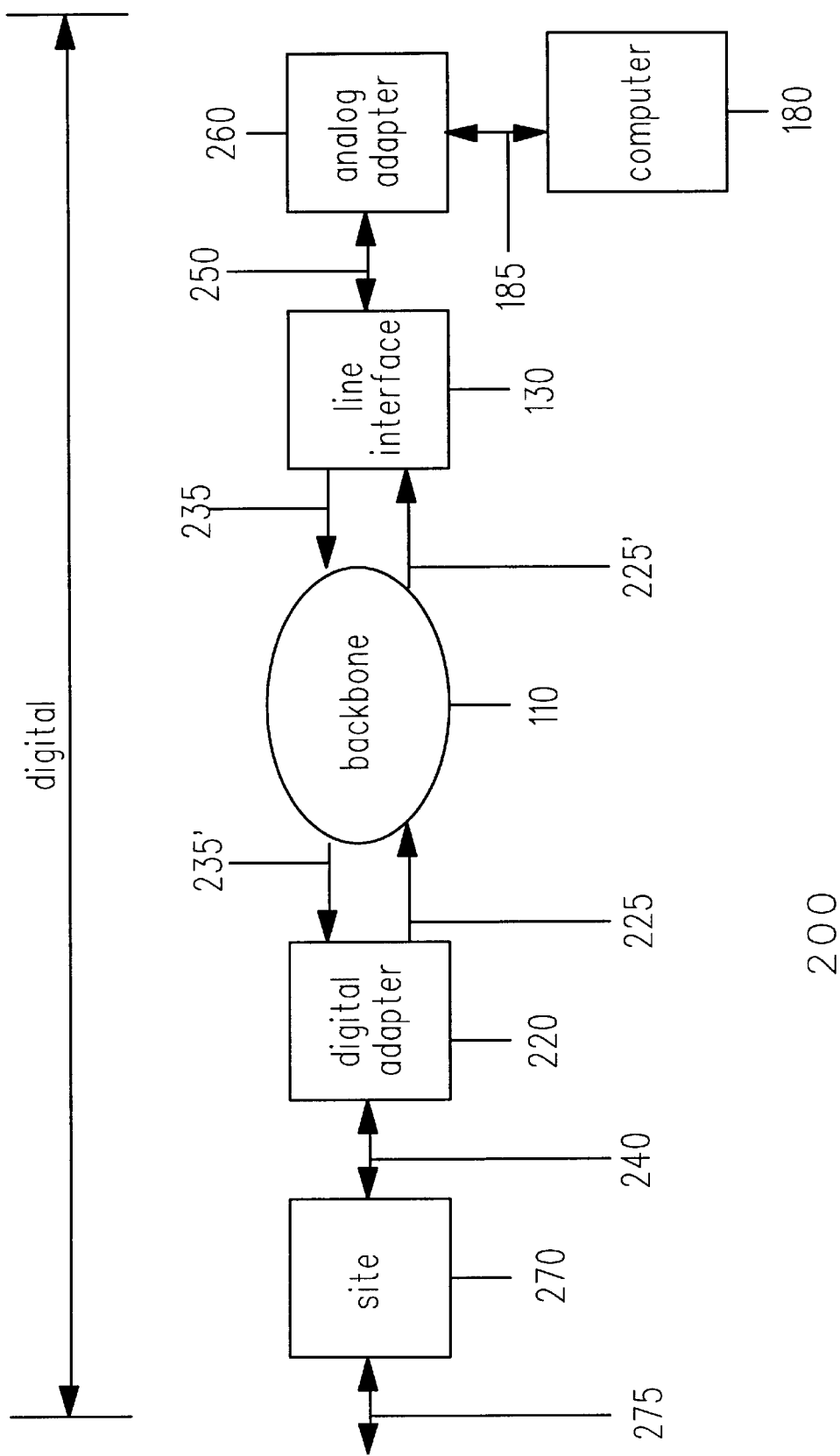
FIG. 2 is an architectural diagram of an exemplary embodiment of the invention.

To better understand the new paradigm, refer to system 200 shown in FIG. 2. In system 200, backbone 110, line interface 130, and computer 180 remain unchanged from the conventional components, outlined above. A first site 270, such as an Internet server site, communicates with a digital adaptor 220, or digital modem, by sending signals over a high-speed link 240. The digital adaptor 220 sends a sequence of octets 225 to backbone 110. Analogously to that described above, backbone 110 sends a similar sequence of octets 225' to conventional line interface 130. Line interface 130 then inverse quantizes octets 225' and transmits the baseband-modulated, line interface signals, outlined above, on loop 250. Analog adaptor 260 receives the baseband signal and may, in turn, possibly equalize and sample the baseband signal, detect the binary information in the demodulated signal, and send the results to computer 180. A reverse path from analog adaptor 260 to digital adaptor 220 may be constructed using conventional modem techniques, for example, V.34 technology, or other technologies can be employed. Moreover, V.34 and other modulation logic may be included as a "back-off" scheme, providing a baseline of functionality if the system is unable to implement the inventive communication techniques described here.

In an exemplary embodiment, useful for description, signal 240 represents a sequence of bits. These bits are encoded in digital adaptor 220 into a sequence of octets 225, which travel to the line interface 130 with minimal alteration (more below). At the line interface 130, the received octets 225' are used to construct an analog baseband modulated signal on loop 250 according to equation (1) and as specified by the relevant μ-law or A-law rules. This latter step, from the perspective of the invention, is now considered as baseband modulation, which as outlined above may be thought of as a variant of PAM, in which the signal constellation corresponds to the μ-law or A-law rules. As will be explained below, an exemplary embodiment uses a subset of the quantization levels to form the signal constellation. The baseband signal is received by the analog adaptor 260, which, possibly after equalization, samples the received baseband signal at the symbol rate, detects the binary information in the sampled signal, and sends the results to computer 180, for example. Among other things, the exemplary arrangement 200, unlike the conventional arrangement 100, avoids quantization noise as a limiting factor to the system's transmission capacity by avoiding analog local loop on one side of the connection, i.e., where loop 140 exists in the conventional arrangement.

Under the new paradigm of FIG. 2, the system 200 is theoretically capable of transmitting data at rates of about 64,000 b/s and more precisely at the rate of the backbone 110, i.e., 8,000 octets per second. (Consequently, if the backbone operated at a faster rate, the transmission rate of the invention could scale correspondingly) To approach the 64,000 b/s rate, however, all of the quantization levels must be used in modulating the baseband signal.

An exemplary embodiment trades some of the theoretically possible bit rate for noise resistance. In particular, though quantization noise is alleviated, noise resistance may help combat other noise in the system.

More specifically, the spacing between some of the adjacent quantizer levels in μ-law and A-law is relatively small. Consequently, the "minimum distance," or $d_{min}$, of a signal constellation that includes these adjacent μ-law and A-law levels as signal points is small. ($d_{min}$ is a known parameter for characterizing the performance of a signal constellation in an uncoded system, and in short, $d_{min}$ refers to the shortest "distance" between different levels in a signal constellation. The distance may be measured according to different known metrics, such as Euclidean distance or Hamming distance.)

One embodiment of the invention, described in the related applications, uses a subset of the μ-law or A-law quantization levels as valid levels of a signal constellation to form an "uncoded" system, or alternatively a "system without memory." (By "uncoded" and "system without memory" it is meant that a received signal is decoded based on the received signal alone in comparison to a signal constellation.) By properly choosing the subset, the minimum distance of the constellation may be increased significantly, but at the expense of reducing the bit rate by sending fewer bits of information per signal point.

Another exemplary embodiment, described below, uses a new technique to arrange subsets of the μ-law or A-law quantization levels to form a new trellis code. The new trellis code, like conventional trellis codes, forms a coded system or a system having memory. (By "coded" and "system with memory" it is meant that the decoded of received symbols depends on a received sequence of signals in comparison to a signal constellation and trellis diagram, and is not based solely on one received signal.) As will be explained below, the new code departs from conventional trellis codes in significant ways, which helps exemplary embodiments attain improvements in noise resistance and performance.

The above system 200 and the corresponding paradigm depart from the conventional arrangement 100 to attain significant advantages, but it also creates design problems and issues with no parallel in the conventional arrangement. Among other things, the new arrangement creates problems of 1. ensuring that the signal 225 is appropriately modified, or spectrally shaped, to improve overall performance;
2. ensuring that the analog adaptor 260 has precise enough timing to properly sample the baseband modulated signals received on loop 250;
3. combating certain distortion introduced by the digital backbone such as "robbed bit signaling," which otherwise would effectively act as a form of noise limiting the system's capacity;
4. handling intersymbol interference (ISI) generated by the line interface 130 and the loop 250 so that the transmitted binary information sent by the source 270 may be recovered; and
5. combating various forms of system-introduced noise, such as memory-less nonlinear distortion from the line interface 130, so that the binary information transmitted sent by the source 270 may be recovered.

Particular mechanisms for addressing the above issues are described in the related applications, identified and incorporated above. For the sake of brevity, these aspects will only be again described in this specification to the extent that they are material to understanding this invention.

To better understand the new trellis code realized in exemplary embodiments of the invention, certain aspects of the widely used companding algorithms A-law and $\mu$-law are first described. Then, conventional trellis coding techniques and principles are described. Afterwards, exemplary arrangements of the new code are described in detail and compared with the conventional techniques to illustrate the advantages attained by the invention.

I. Outline of A-law and $\mu$-law.

A-law and $\mu$-law are the two most prevalent companding algorithms used in PSTNs. $\mu$-law is used in North America, and A-law is used in other parts of the world. System designers familiar with one algorithm tend to be familiar with the other, and each algorithm is generally considered as an equivalent of the other.

Figures 3A, 3B:
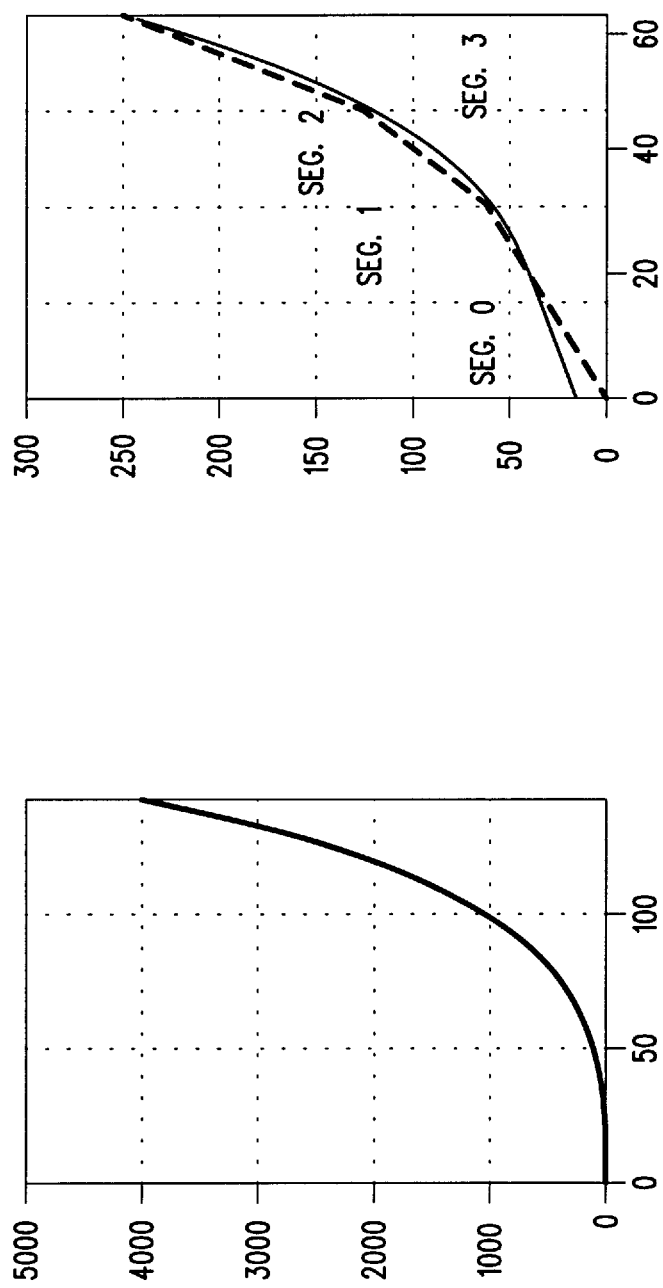
FIGS. 3A–B are charts of the known A-law companding algorithm.

FIG. 3A illustrates the input-output relationship for positive values of A-law; $\mu$-law has the same general shape, but different output values, as explained below. As suggested by FIG. 3A, A-law is a piece-wise linear, logarithmic approximation of an exponential curve. It has a finer level quantization, i.e., smaller spacings, for smaller valued inputs and coarser quantization, i.e., larger spacings, for higher valued inputs.

Both A-law and $\mu$-law have 8 positive and 8 negative segments. Each segment, in turn, has 16 points, yielding 256 quantization points.

FIG. 3B shows segments 0 through 3 and also includes a solid line representing an exponential curve. This figure illustrates that A-law closely follows the exponential relationship, except near the origin. This curve also better illustrates the piece-wise linear relationship of A-law.

Under A-law, each segment j>1 1 covers the interval $16*2^j$ to $16*2^{j+1}$. Each point is separated from an adjacent point in the segment by $2^j$. The first point in a segment is at $16*2^{j+2j-1}$. The interval between the last point of segment j and the first point of segment j+1 is $1.5*2^j$. Segment 0, i.e., j=0, extends by steps of 2 between the values 1 and 31. It is collinear with segment 1 and it helps ensure a linear transition between the positive and negative segments.

$\mu$-law is analogous to A-law, but has the following differences. The values for $\mu$-law segments j+1 1, can be calculated from the A-law values with the equation m=2a −33 in which a is the A-law value and m is the corresponding $\mu$-law value. Segment 0, i.e., j =0, extends between 0 and 30 by steps of 2. Thus, under $\mu$-law, there are only 255 distinct levels, in effect, having a positive and a negative level 0.

For the sake of comparison, the last segment of A-law, i.e., segment 7, has values extending from 2112 to 4032. Segment 7 of $\mu$-law, on the other hand, extends from 4191 to 8031.

This outline is for convenience and should not be considered as comprehensive. For further detail, consult J. BELLAMY, DIGITAL TELEPHONY (2d ed., Wiley 1991) or one of the corresponding ITU standards.

II. Conventional Trellis Coding Techniques

This section is not a comprehensive review of trellis codes and instead outlines trellis codes to the extent that they are material to understanding the invention. More comprehensive treatments of trellis coding may be found in the literature, for example, EZIO BIGLIERI ET AL., INTRODUCTION TO TRELLIS-CODED MODULATION WITH APPLICATIONS (MacMillan 1991) and JOHN G. PROAKIS, DIGITAL COMMUNICATIONS 511–526 (McGraw Hill 1995).

Trellis codes have been known for some time. As will be explained below, known trellis codes are constructed and used in view of a few well established heuristics and principles. It was thought that these heuristics and principles were largely responsible for providing trellis coding's advantages in noise resistance and performance. This section outlines these heuristics and principles so that the invention's new heuristics and principles, described in a later section, may be more fully understood and appreciated.

Trellis codes are particularly used in contexts of bandwidth constrained channels. To gain performance without increasing the signal bandwidth, trellis codes use more signal points than the number of points that are minimally necessary to ensure a desired bit rate. The extra signal points, or signal point expansion, requires an increase in signal power to maintain the same error rate as the uncoded system. Thus, for the coding to be useful it must overcome the penalty of needing extra power.

Conventional trellis codes overcome the above penalty associated with extra signal points by effectively combining, or integrating, the modulation and encoding processes. To date, perhaps the most well known approach is the one developed by Ungerboeck, which is outlined below, and which is known as "set partitioning."

Under the convention approaches, designers of trellis codes may freely choose the signal points from which the code is to be constructed. Generally, the only limiting factors is to ensure that the selection of signal points and the corresponding sequences that form the code meet some stated power constraint.

The underlying principle of trellis coding is that, although an expanded set of signal points is used, only a subset of the potential signals sequences are considered as valid. Because the encoding and decoding are based on sequences of signals, and not just isolated signals, a trellis coded system has memory. As will be explained below, this results in an increased noise resistance.

To provide a baseline for further description, first consider an uncoded system using baseband modulation in which each signal carries information in its amplitude component. The constellation of signal points uses $2^k$ levels each separated from an adjacent level by a distance d. Each level corresponds to a "symbol." The system transmits R symbols per second, attaining a transmission rate of kR bits per second. R is typically 8000 symbols per second.

Figure 5:
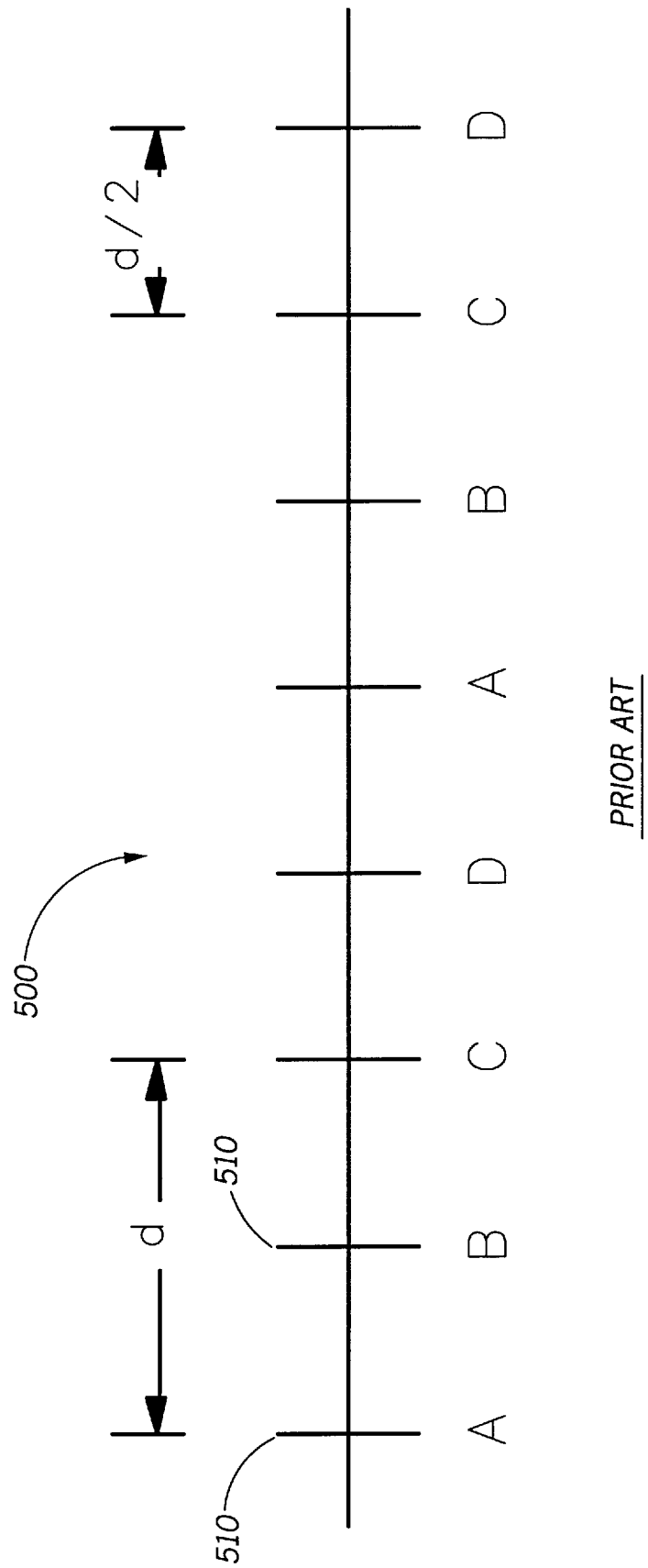
FIG. 5 is a one-dimensional constellation of evenly spaced signal points.

Now consider a portion of a one-dimensional constellation, shown in FIG. 5, which is useful for describing conventional trellis coding and in particular the set partitioning concept for one-dimensional constellations. Like the above textual example, the individual signal points carry information in their amplitude components. In this example, however, assume that the constellation has $2^{k+1}$ signal points. Moreover, in this example, each signal point is separated from an adjacent point by a distance d/2. In the constellation 500, the signal points, represented by hashes 510, are grouped into four alternating subsets A, B, C, D. Each subset has $2^{k-1}$ signal points.

If the constellation 500 were used in an uncoded system, performance could increase in comparison to the uncoded system, described above. The noise resistance, however, would decrease. In particular, the new system could transmit (k+1)R bits per second, instead of kR bits per second, but the minimum distance would be cut in half, from d to d/2.

Figure 6:
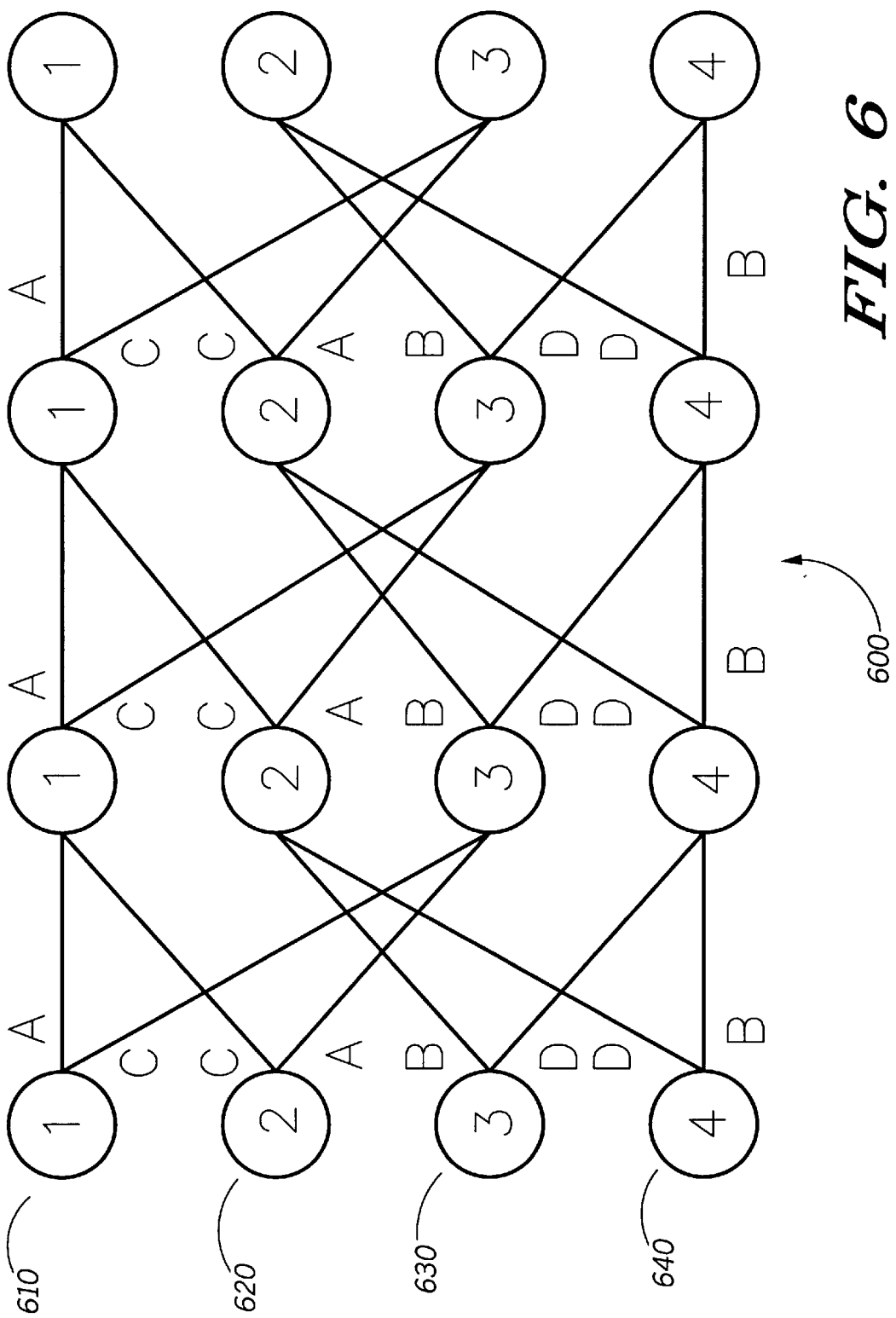
FIG. 6 is a trellis diagram of an exemplary embodiment of the invention.

Now consider the exemplary four-state "trellis diagram," shown in FIG. 6. This form of description is commonly found in the art to describe the states that a transmitter, such as digital adapter 220, could encounter in transmitting signals according to a trellis coded scheme. The trellis 600 includes columns of four states, represented by nodes 610–640, which are repeated 3 times in this diagram for convenience, but which in reality are repeated ad infinitum. Each node contains the state's number. The branches exiting each state indicate state transitions.

Thus, for example, when in state 1, transmitter is constrained to sending a signal from subsets A and C, as indicated by the labels on the branches exiting state 1. Thus, when in state 1, the transmitter may only select a signal point from the $2^k$ levels in the combination of subsets A and C. If the signal is selected from subset A, the transmitter remains in state 1; if the signal is selected from subset C, the transmitter enters state 3. To carry the illustration one step further, once the transmitter is in state 3, it is constrained to sending a signal from subsets B and D.

The bit rate— like the uncoded example— is kR bits per second. This is so, because any given state may only select a signal point, or level, from a combination of subsets providing $2^k$ levels. Thus, only k bits per symbol are transmitted, and again the system is assumed to transmit R symbols per second.

However, in this example, the total Euclidean distance between valid sequences of signals is at least 1.5 times as great as the uncoded example. (The distance parameter used in characterizing sequences is often referred to as $d_{free}$.) This improvement in Euclidean distance can be shown as follows. The worst case distance is achieved by pairs of sequences AAA . . . and CBC . . . , beginning from state 1. This is so, because the distance between A and C points is at least d (see FIG. 5) and the distance between points in A and B is at least d/2. Thus, the square of the total distance between the two distances is at least $$d^2 + 0.25d^2 + d^2 = 2.25d^2 = (1.5d)^2$$

The above example relied on a relatively simple one-dimensional constellation. Skilled artisans will appreciate that the literature has discussed considerably more complicated arrangements involving multidimensional constellations and the like. Generally speaking, the construction of a trellis code involves selecting the number of transmitter states, selecting the number of signal points, assigning values to the signal points, and assigning signal points to subsets.

To date, many design rules and heuristics have been developed for designing trellis coded systems. See, for example, Ungerboeck rules, described in EZIO BIGLIERI ET AL., INTRODUCTION TO TRELLIS-CODED MODULATION WITH APPLICATIONS (MacMillan 1991) at page 78, or design rules for conventional four-state trellis described in JOHN G. PROAKIS, DIGITAL COMMUNICATIONS (McGraw Hill 1995) at pages 517–8.

The receiver, such as analog adapter 260, uses logic to predict what signals were most likely sent that would have yielded a received sequence of signals. The Viterbi algorithm, or one of its numerous variations, may be used to examine a received signal sequence in comparison to a set of corresponding receive constellations and trellis state.

Some proposals have varied from the above example. In the above arrangement, the set partitioning of signal points creates disjoint subsets; that is, one subset does not overlap with another by sharing signal points. Also, in the above example, the signal points could be freely chosen by the designer (within some stated power constraints) and each signal point was separated from an adjacent signal by an equal amount.

One proposal suggested a trellis coded scheme using a one dimensional constellation in which the signal points were not separated from adjacent points by an equal amount. Under this first proposal, however, the sets were disjoint, but the signal points could be freely chosen by the designer. (See EZIO BIGLIERI ET AL., INTRODUCTION TO TRELLIS-CODED MODULATION WITH APPLICATIONS 174–179 (MacMillan 1991))

A second proposal suggested a trellis coded scheme using overlapping subsets. Under this second proposal, however, the signal points could be freely chosen by the designer, and the signal points were equally spaced in the constellation; i.e., they were separated from adjacent signal points by an equal amount. The constellation was divided into two sets, and each set was divided into two subsets. The two subsets of each set shared the inner points of the constellation (i.e., the subsets overlapped at the inner points) and differed by having unique outer points. Relatively modest gains were achieved. (See Forney et al., Efficient Modulation for Band-Limited Channels, IEEE J. ON SELECTED AREAS OF COMM., VOL. SAC-2, No. 5, 632, 643–4 (Sept. 1984))

III. New Code

An exemplary embodiment of the invention uses a new trellis coding arrangement that must operate in the architecture described above with reference to FIG. 2. As outlined above, the above architecture views loop 250 as carrying one-dimensional baseband signals. The amplitude values of these signals are prescribed by the underlying companding algorithm, and as described in the related applications, the actual signals may vary from the prescribed signals for several reasons.

As will be explained below, the context of FIG. 2 limits the universe of signal points from which a code may be constructed. A designer cannot choose signal points freely with the only limit being some stated power constraint. Instead, the code must be chosen from selecting signal points from the 256 points provided by the line interface 130. Thus, not only is the universe of signal points limited, the spacing of signal points is uneven, following the spacing provided by the underlying companding algorithm.

The new code is constructed with a new set of design heuristics. In particular, the new code uses a constellation a) in which the distance between adjacent signal points need not be uniform;

b) in which the distance between adjacent points need not exceed d/2 to attain improvements over an uncoded system;

c) in which the signal points are arranged into subsets that may overlap with one another; and d) in which the overlapping signal points occur at outer points of the constellation.

Figure 7:
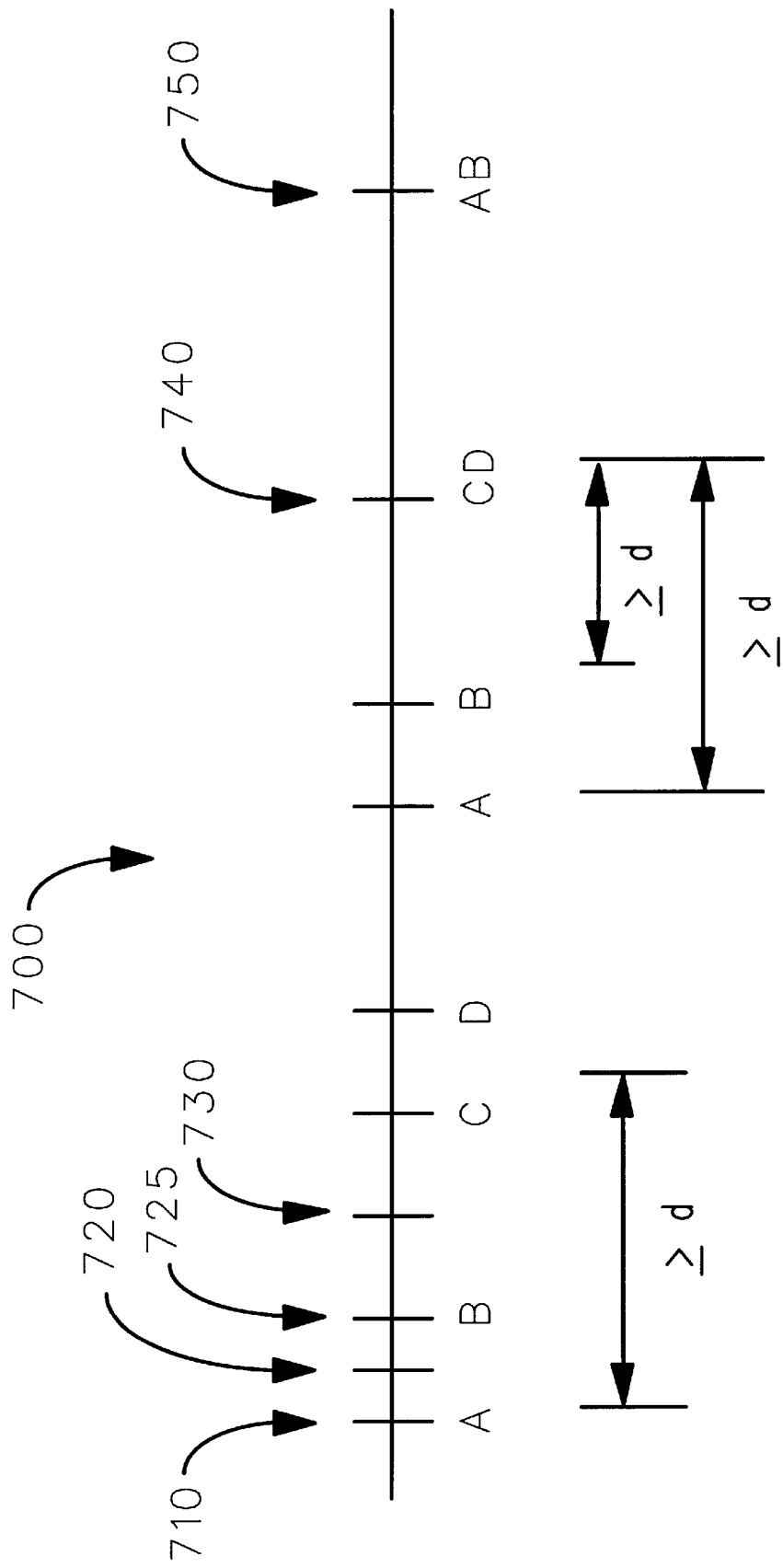
FIG. 7 is a one-dimensional partial constellation of signal points chosen from a fixed set of signal points according to an exemplary embodiment of the invention.

FIG. 7 shows a portion of a constellation 700 useful for describing exemplary embodiments of the invention. The constellation is one dimensional, with each signal point, e.g., 710, carrying information in the signal's amplitude. The signal points are unevenly spaced, analogously to the situation in A-law or $\mu$law. Signal points associated with a set have that set shown below the point. For example, signal point 710 is associated with a set A. Not all available signal points are associated with a set. For example, hash marks 720 and 730 correspond to amplitude levels prescribed by the underlying companding algorithm, but which are not used in the code. Thus, there are no labels underneath these hashes. Some points, e.g., 740, are associated with more than one set. For example, signal point 740 is shared by sets C and D, or alternatively, the overlap of sets C and D includes signal point 740.

Using constellation 700 with the trellis 600 results in a code with a minimum distance of 2 d, a slight decrease from the 1.5 d achievable before. The decrease occurs because the distance between the A and the B sets can now be zero, e.g., signal point 750. Thus, following the description above of conventional trellis codes, the square of the total distance between AAA . . . and CBC . . . is at least $$d^2 + 0d^2 + d^2 = 2d^2$$

Thus, the minimum distance is $\sqrt{2}$.

Heuristic (c), i.e., allowing subsets to overlap, is especially significant as it allows subsets to have a larger size. Thus, when the transmitter, e.g., adapter 220, is in a given state, even though it is constrained to sending signal points from two of the four subsets, the two subsets now contain more signal points and, consequently, the transmission rate is higher than kR bits per second.

Preferably, only the points toward the edges of the constellation, i.e., the outer points of constellation 700, are shared in different subsets. These points have a larger distance to an adjacent point than the design distance d of the code. (Design distance d is the smallest distance between a point in A and a point in C or alternatively B and D). If there are intermediate points available, they should be used to minimize the overlap of subsets.

Figure 8A:
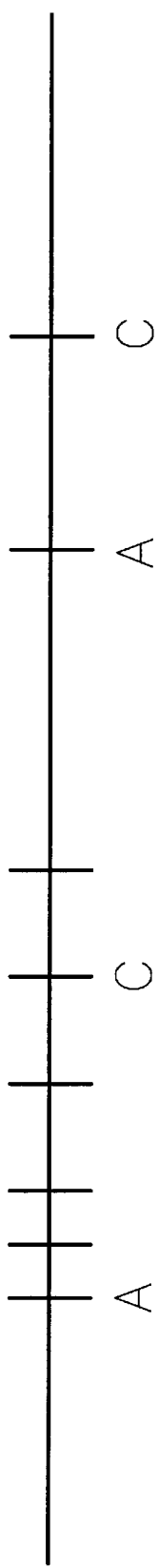
FIGS. 8A–C illustrate the steps of constructing the partial constellation of FIG. 7.
Figure 8B:
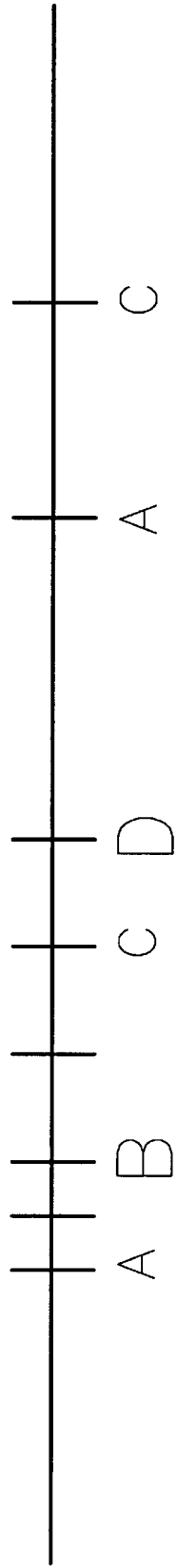
Figure 8C:
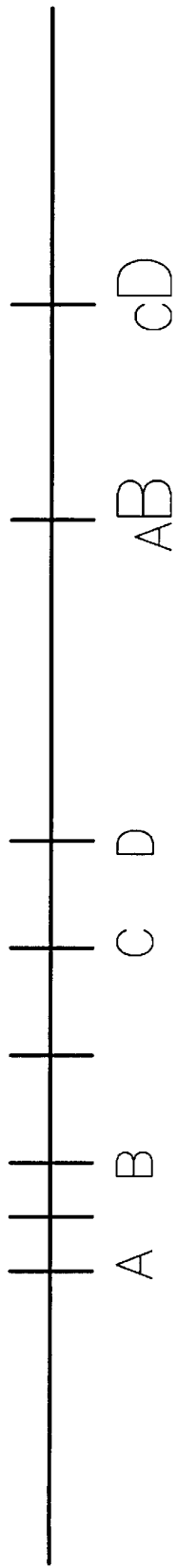

This assignments of points to subsets may best be understood by considering FIGS. 8A–C. FIG. 8A shows an initial assignment in which points are chosen from the limited universe of points, in which each chosen point is separated from an adjacent by at least a distance d. The chosen points are alternatively assigned to subsets A and C. Next, another set of points are sought from the limited universe of points in which each newly sought point is positioned intermediate the initial set and which satisfies the design criteria of distance equal to d. The newly selected points are alternatively assigned to subsets B and D. Thus, at this point, the distance between any point in A to any point in C is at least d, and the distance between any point in B to any point in D is at least d . However, the distance between any point in A to any point in B or D may be less than d, and the distance between any point in C to any point in B or D may be less than d.

This selection and assignment of intermediate points is illustrated in FIG. 8B, with the newly chosen points shown in larger size font. Because there is a limited universe of points, it is likely that the above step will not be able to find a sufficient number of intermediate points to keep an alternating sequence. Thus, there is no B signal point between the rightmost shown A and C signal points.

A third step addresses this by assigning signal points to be shared between sets. That is, if the second step cannot choose an intermediate point, some points are assigned to two subsets. This third step is shown in FIG. 8C, with the newly chosen points, creating overlapping sets, shown in larger size font. The above statements about distance between adjacent points are still valid.

The example of FIGS. 8A–C illustrate a portion of a code and a technique for constructing codes. Due to the number of points and their separation a full constellation with set assignments cannot be meaningfully diagrammed. This should be appreciated by referring back to FIG. 3, which illustrates the range of points and their separation. Skilled artisans will appreciate, however, that the above heuristics may be used to construct many codes from a limited set of signal points.

The selection of points, as outlined above, will depend on the desired distance, the desired number of transmitter states and the like.

Appendix A provides one exemplary assignment of signal points from A law into four sets that may be used in a transmitter implementing the four-state trellis 600 of FIG. 6. In the tables of Appendix A, the columns alternate between the A-law values and the subset, or subsets, to which the point is assigned. Thus, for example, the point with output value 1 is not assigned to any set; point 3 is assigned to set A; and point 264 is assigned to C and D. Negative values follow an opposite order. Thus, point –3 is in subset D; point –7 is in subset C; point –11 is in subset B; and so on.

By way of comparison, the arrangement of appendix A attains a distance of d equal to 8 and the size of the subsets A and C and of B and D are 190. If R equals 8000 symbols per second the communication rate equals $8000 * \log_2(190)$, approximately 60500 bits per second.

If the same distance were attained but with the requirement that all four subsets be disjoint, i.e., the conventional arrangement, the size of the subsets A and C or B and D would be 111. This would reduced the communication rate to $8000 * \log_2(111)$.

Though the new code attains improved performance, notably in transmission rates, it encounters problems with little analogy to a trellis codes with disjoint subsets. In particular, the code is "quasi-catastrophic. The degree of "quasi-catastrophicity" increases with the number of points shared between subsets. Using intermediate points, as outlined above, helps reduce quasi-catastrophicity at least in comparison to avoiding such a step and instead immediately proceeding to assigning signal points to be shared between sets. Quasi-catastrophic codes may suffer from reduced noise resistance.

Figure 4A:
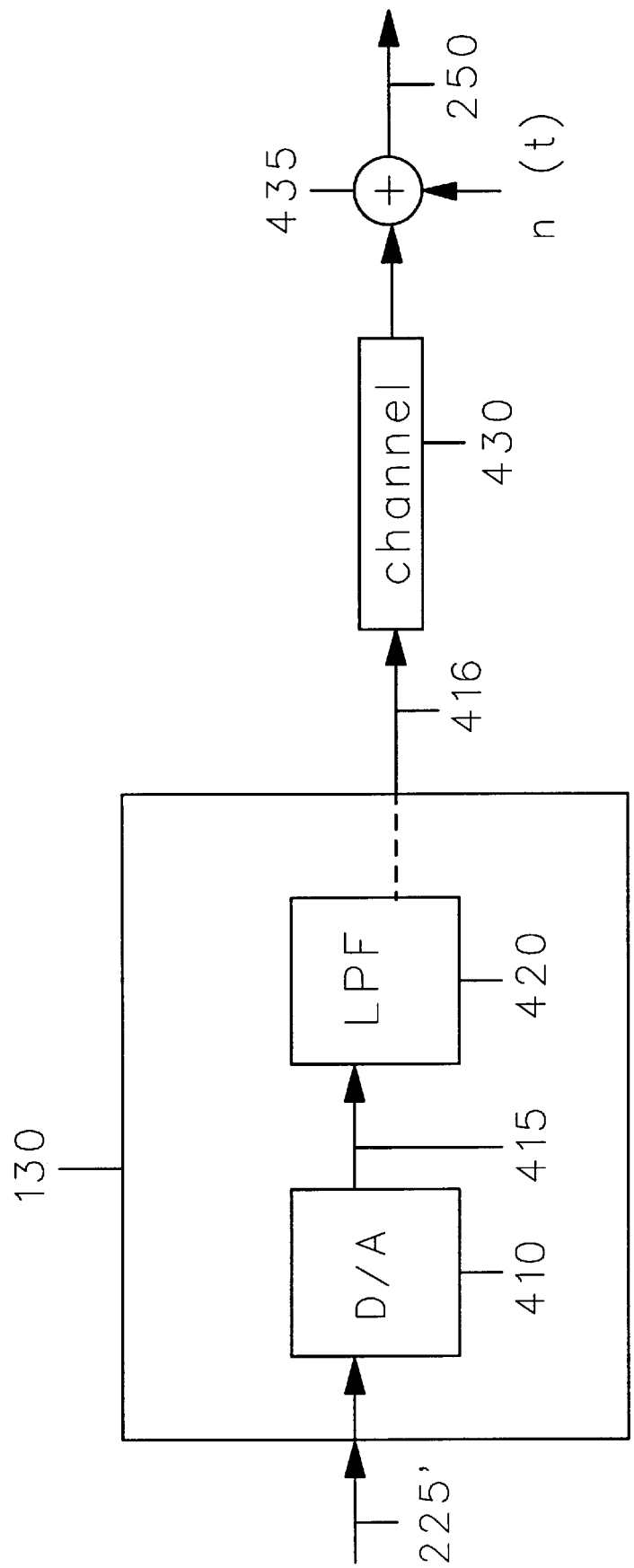
FIGS. 4A–B are architectural diagrams showing a conventional line interface, in part, a local loop, and a decoder of an exemplary embodiment of the invention.
Figure 4B:
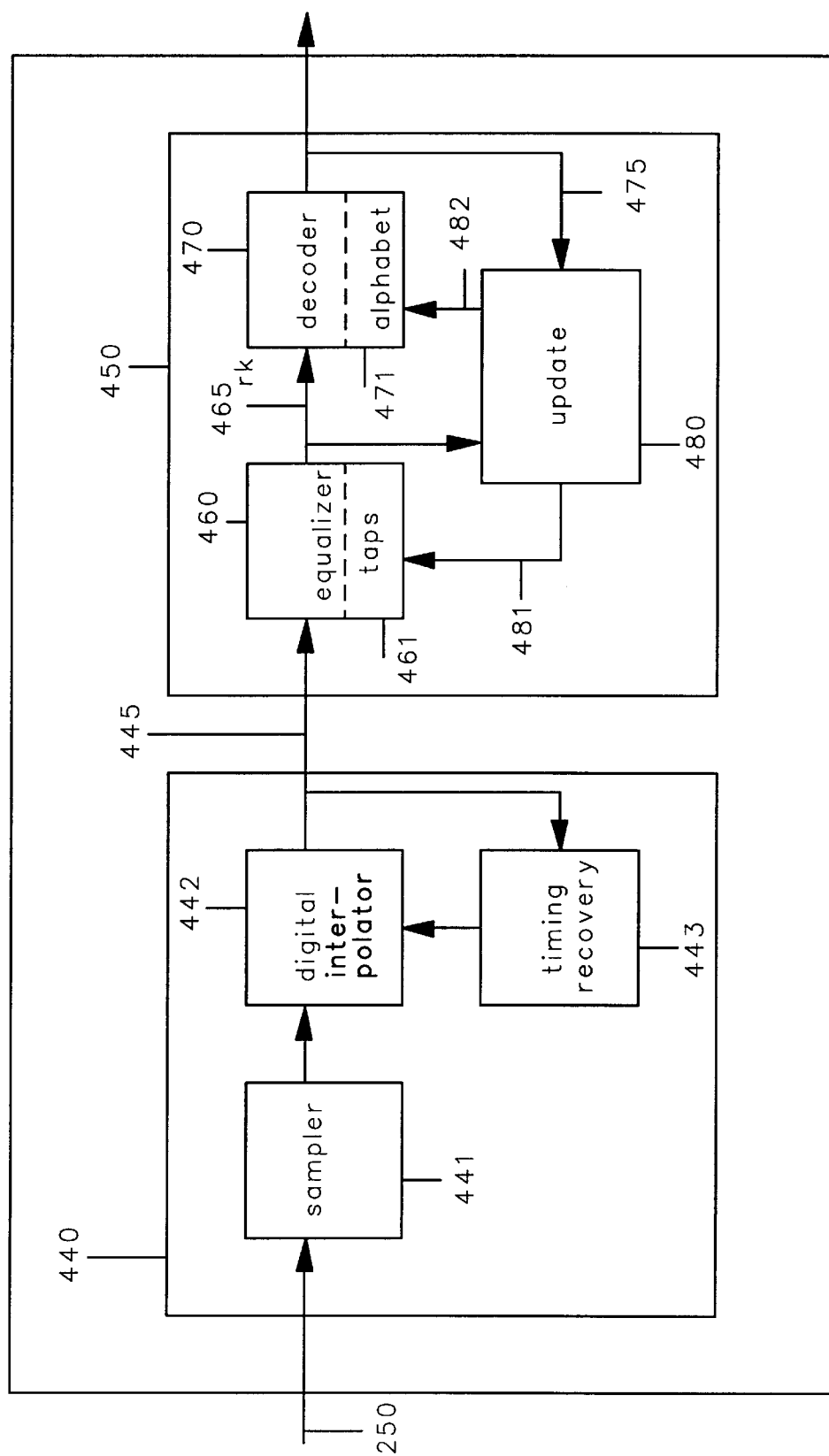

One way to mitigate the affects of quasi-catastrophic codes is by using a larger decoding memories for a Viterbi decoder or similar structure within the analog adapter 260 (for example in decoder 470 of FIG. 4A, described in the related applications). In this fashion, the probability of having quasi-catastrophic inputs within the time window corresponding to the memory's length is reduced to an acceptable level. This solution, however, increases the decoding delay.

Another way to combat the effects of the quasi catastrophic codes is to use time-varying coding. Under this scenario, the definitions of the subsets vary with time. From time-to-time, for example, once every eight symbols, the subsets used by the transmitter are disjoint. This removes the quasi catastrophic nature of the system while not significantly reducing the throughput.

Figure 9:
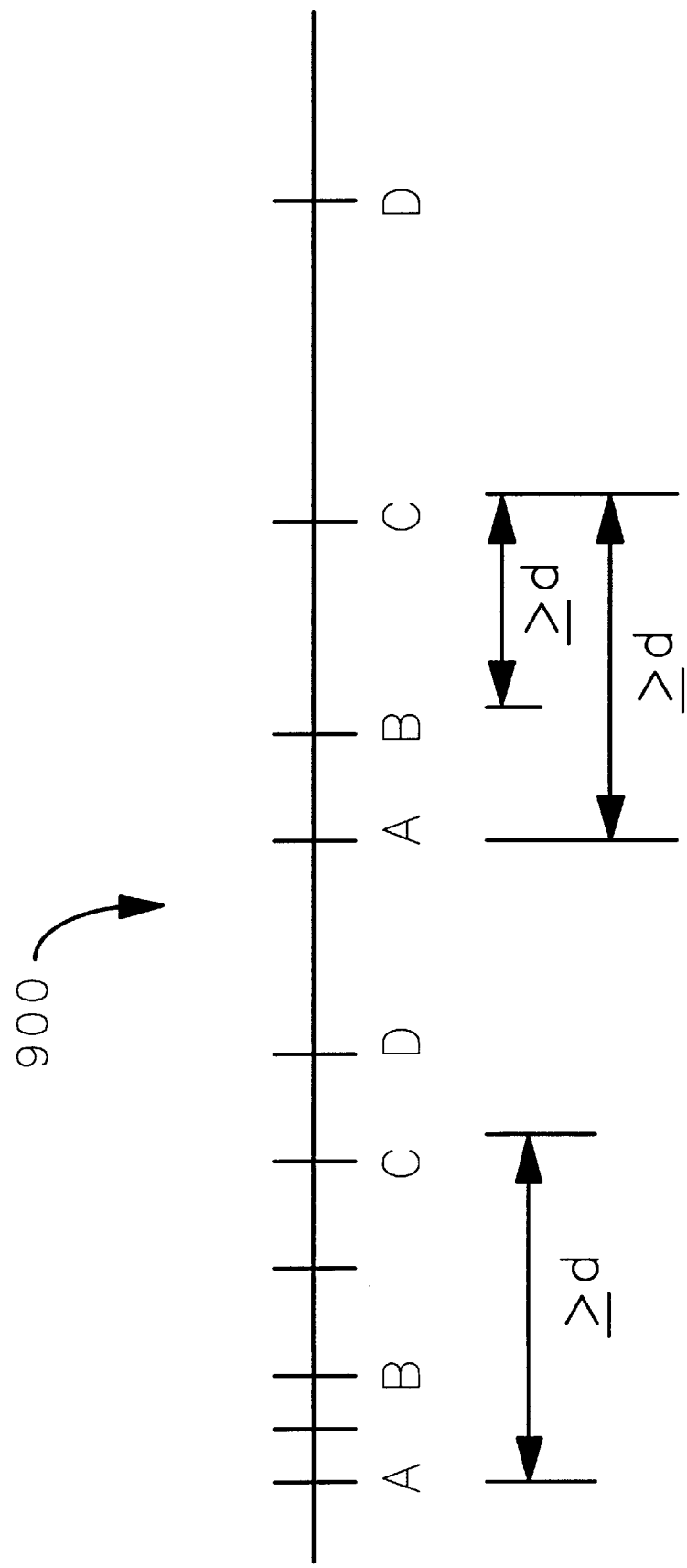
FIG. 9 is is a one-dimensional partial constellation of signal points chosen from a fixed set of signal points according to an exemplary embodiment of the invention and used to mitigate quasi catastrophic codes.

Thus, for example, 7 out of 8 cycles, the digital adapter 220 uses the subset assignment of FIG. 7, and in the other cycle, the adapter 220 uses a different subset assignment that lacks overlapping subsets. FIG. 9 illustrates a portion of such a constellation 900, which corresponds to a portion of the constellation 700 of FIG. 7. In constellation 900, each subset now contains fewer signal points, thus the bit rate drops accordingly. The overall bit rate of the system is the weighted average of the two.

Although the novel trellis code is discussed with respect to the system of FIG. 2, it will be apparent to those skilled in the art that the same techniques can be used and applied to other systems in which codes are constructed from a fixed set of signal points.

Moreover, skilled artisans will understand that the decoding of the above code is not limited to Viterbi detectors and that other receiver techniques are applicable, such as linear adaptive equalizers, non-optimal Viterbi equalizers, ML detectors, decision feedback equalizers.

The present invention may be embodied in other specific forms without departing from the spirit or essential characteristics. The described embodiments are to be considered in all respects only as illustrative and not restrictive.

Appendix A

This appendix shows an exemplary grouping of A-law into four overlapping subsets A–D to form a four state code having a distance d=8. Only positive values of A-law are shown. Negative values have their order reversed. Thus, point −3 is in subset D; −7 is in subset c; −11 is in subset B; −15 is in subset A and so on.

| | | | | | | | |
|---|---|---|---|---|---|---|---|
| 1 | | 33 | | 66 | | 132 | D |
| 3 | A | 35 | A | 70 | A | 140 | AB |
| 5 | | 37 | | 74 | B | 148 | CD |
| 7 | B | 39 | B | 78 | C | 156 | AB |
| 9 | | 41 | | 82 | D | 164 | CD |
| 11 | C | 43 | C | 86 | A | 172 | AB |
| 13 | | 45 | | 90 | B | 180 | CD |
| 15 | D | 47 | D | 94 | C | 188 | AB |
| 17 | | 49 | | 98 | D | 196 | CD |
| 19 | A | 51 | A | 102 | A | 204 | AB |
| 21 | | 53 | | 106 | B | 212 | CD |
| 23 | B | 55 | B | 110 | C | 220 | AB |
| 25 | | 57 | | 114 | D | 228 | CD |
| 27 | C | 59 | C | 118 | A | 236 | AB |
| 29 | | 61 | | 122 | B | 244 | CD |
| 31 | D | 63 | D | 126 | C | 252 | AB |
| 264 | CD | 528 | CD | 1056 | CD | 2112 | CD |
| 280 | AB | 560 | AB | 1120 | AB | 2240 | AB |
| 296 | CD | 592 | CD | 1184 | CD | 2368 | CD |
| 312 | AB | 624 | AB | 1248 | AB | 2496 | AB |
| 328 | CD | 656 | CD | 1312 | CD | 1624 | CD |
| 344 | AB | 688 | AB | 1376 | AB | 2752 | AB |
| 360 | CD | 720 | CD | 1440 | CD | 2880 | CD |
| 376 | AB | 752 | AB | 1504 | AB | 3008 | AB |
| 392 | CD | 784 | CD | 1568 | CD | 3136 | CD |
| 408 | AB | 816 | AB | 1632 | AB | 3264 | AB |
| 424 | CD | 848 | CD | 1696 | CD | 3392 | CD |
| 440 | AB | 880 | AB | 1760 | AB | 3520 | AB |
| 456 | CD | 912 | CD | 1824 | CD | 3648 | CD |
| 472 | AB | 944 | AB | 1888 | AB | 3776 | AB |
| 488 | CD | 976 | CD | 1952 | CD | 3904 | CD |
| 504 | AB | 1008 | AB | 2016 | AB | 4032 | AB |

What is claimed is:

1. A method of communicating between a transmitter and a receiver in a system inherently limited to having a fixed set of potential signal points that the system uses to communicate, the method comprising the steps of:

selecting signal points from the fixed set to form subsets of signal points, wherein one subset may overlap with another subset;

associating the subsets with transmitter states, such that a given transmitter state is associated with some of the subsets;

transmitting information according to the transmitter states, so that when in a given transmitter state information is mapped to a signal point in one of the subsets associated with the given transmitter state and receiving the transmitted signal point to form a received sequence of signal points and decoding the received sequence to predict the information that caused the transmitted signal point.

2. The method of claim 1 wherein the system is inherently limited to baseband signals that are unevenly spaced with respect to adjacent signal points according to a logarithmic scale and wherein the selecting step forms subsets such that signal points having larger spacings to an adjacent signal point are shared but signal points having smaller spacings are not shared by subsets.

3. The method of claim 1 wherein the subsets are associated to transmitter states such that the signal points transmittable in a given state maintain a minimum distance of d even though the combination of all signal points selected from the fixed set does not ensure a minimum distance to an adjacent signal point of at least d/2.

4. The method of claim 2 further comprising the steps of selecting signal points from the fixed set to form a second set of subsets of signal points, wherein the second set of subsets do not overlap with other subsets of the second set;

associating the second set of subsets with transmitter states, such that a given transmitter state is associated with some of the subsets of the second set;

for a portion of transmitter cycles, transmitting information according to the transmitter states, so that when in a given transmitter state information is mapped to one of the potentially-overlapping subsets associated with that state and to a signal point in the mapped subset;

for a remaining portion of transmitter cycles, transmitting information according to the transmitter states, so that when in a given transmitter state information is mapped to one of the second set of subsets associated with that state and to a signal point in the mapped subset;

receiving the transmitted signal point to form a received sequence of signal points and decoding the received sequence to predict the information that caused the transmitted signal point.

\* \* \* \* \*